(12) United States Patent
Khalifa et al.

(10) Patent No.: US 9,335,233 B2
(45) Date of Patent: May 10, 2016

(54) IN-PIPE LEAK DETECTION BASED ON PRESSURE GRADIENT

(75) Inventors: Atia Khalifa, Dhahran (SA); Rached Ben-Mansour, Dhahran (SA); Kamal Youcef-Toumi, Cambridge, MA (US); Mohamed A. Habib, Dhahran (SA); Dimitrios Chatzigeorgiou, Somerville, MA (US)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 370 days.

(21) Appl. No.: 13/095,135

(22) Filed: Apr. 27, 2011

(65) Prior Publication Data

US 2012/0272722 A1    Nov. 1, 2012

(51) Int. Cl.
*G01M 3/28*    (2006.01)

(52) U.S. Cl.
CPC .......... *G01M 3/2815* (2013.01); *G01M 3/2823* (2013.01)

(58) Field of Classification Search
CPC .................................................. G01M 3/2823
USPC ...................................................... 73/40.5 R
See application file for complete search history.

(56) References Cited

U.S. PATENT DOCUMENTS

| | | | |
|---|---|---|---|
| 3,132,506 A | 5/1964 | Pritchett | |
| 3,132,508 A | 5/1964 | Pritchett | |
| 3,691,819 A | 9/1972 | Guest | |
| 3,837,214 A | 9/1974 | Guest | |
| 4,375,763 A * | 3/1983 | Hogan | 73/40.5 R |
| 4,430,895 A * | 2/1984 | Colton | 73/497 |
| 5,563,335 A * | 10/1996 | Howard | G01M 3/20 73/46 |
| 5,864,232 A * | 1/1999 | Laursen | G01N 27/902 324/220 |
| 7,616,011 B2 * | 11/2009 | Zarabadi et al. | 324/678 |
| 8,220,337 B2 * | 7/2012 | Has | 73/718 |
| 2011/0103189 A1 * | 5/2011 | Paulson | F16L 55/48 367/89 |
| 2012/0285221 A1 * | 11/2012 | Al-Qahtani et al. | 73/40.5 A |

OTHER PUBLICATIONS

The International Search Report and Written Opinion Issued in Connection with International Patent Application No. PCT/US2012/029626 mailed on Oct. 4, 2012

(Continued)

*Primary Examiner* — Laura Martin
*Assistant Examiner* — Alex Devito
(74) *Attorney, Agent, or Firm* — Sam Pasternack; MIT Technology Licensing Office

(57) ABSTRACT

Leak detection system. The system includes a structure sized to fit within a pipe for supporting at least one sensing element near an inside wall of the pipe, whereby a pressure gradient at a leak in the pipe will cause the sensing element to respond. Structure is provided for detecting movement or deformation of the sensing element, the movement or deformation indicating the presence of a leak. In a preferred embodiment, the structure includes two spaced-apart rings for supporting the at least one sensing element. The sensing element is a diaphragm in a preferred embodiment. In this embodiment, the sensing element is supported for movement with respect to the ring structure which includes sensing circuitry for detecting the movement to indicate a leak. Other embodiments employ different sensing elements that respond to pressure gradients near leaks.

8 Claims, 5 Drawing Sheets

(56) References Cited

OTHER PUBLICATIONS

Hunaidi, O., Chu, W., Wang, A., and Guan, W., 1999, leak detection method for plastic water distribution pipes, Advancing the Science of Water, Fort Lauderdale Technology Transfer Conference, AWWA Research Foundation, Ft. Lauderdale, Florida, Feb. 18, 249-270.

Geiger, G., 2006, State-of-the-art in leak detection and localization, Oil Gas European Magazine, 32(4), 193-198.

Hunaidi, O. and Chu, W. T., 1999, Acoustical Characteristics of Leak Signals in Plastic Distribution Pipes, Applied Acoustics, 58(3):235-254.

Yang, J., Wen, Y. and Li, P., 2008, Leak location using blind system identification in water disribution piplines, Journal of sound and vibration, 310:134-148.

Kurtz, D.W., 2006, Developments in a Free-Swimming Acoustic Leak Detection System for Water Transmission Pipelines, ASCE, Proceedings of the 2006 Pipeline Division Specialty Conference Pipelines 2006: Service to the Owner, 211(40854):25, Chicago, IL, USA, Jul. 30-Aug. 2.

Kurtz, D.W., 2007, Case Studies for a Free-Swimming Acoustic Leak Detection System used in Large Diameter Transmission Pipelines, Proceedings of the ASCE International Conference on Pipeline Engineering and Construction, p. 105, Pipelines 2007: Advances and Experiences with Trenchless, Boston, MA, USA, Jul. 8-11.

Galleher, J. J., and Kurtz, D. W., 2008, Evaluation of an Un-Tethered Free-Swimming Acoustic Leak Detection Technology, Proceedings of Pipelines Congress 2008—Pipeline Asset Management: Maximizing Performance of Our Pipeline Infrastructure, 321, Atlanta, Georgia, Jul. 22-28.

International Search Report PCT/US2012/029626 mailed on Nov. 7, 2013.

* cited by examiner

IN-PIPE LEAK DETECTION BASED ON PRESSURE GRADIENT

BACKGROUND OF THE INVENTION

This invention relates to leak detection and more particularly to in-pipe leak detection in which a sensor detects the local pressure gradient near a leak.

A lot of research around the world is being considered to develop technologies to detect water leaks in water distribution networks. Water leakage is typically in the range of 20 to 30% on average of the water transported across the water distribution networks [1]; it may reach 50% for old networks. Numbers in brackets refer to the references listed herewith. The contents of all of these references are incorporated herein by reference in their entirety. Current leak detection methods [1, 2] include acoustic leak noise correlators, surface listening devices, ground penetrating radars, infrared thermography, chemical tracing, monitoring the flow field, and others. These methods have many limitations when applied to actual water distribution networks. They can be expensive, time consuming, not accurate enough, have noise interference problems, depend on pipe material, and the pipe location must be known.

Acoustic and leak noise correlators [3, 4] are the widely used methods at the present time by water municipalities worldwide. These methods work well in metal pipes; however, the effectiveness of the method is doubtful with plastic pipes due to high signal attenuation, low frequency content, and the pronounced effect of fittings on the wave propagation. Recently, leak detection using inside pipe moving sensors, like Sahara and Smartball systems [5-7], is considered to overcome many shortcomings of the conventional acoustic leak detection devices. The motivation for venturing into this technique stems from the ability to survey long distance pipeline in a network, surveying portions of the network which may be logistically difficult to access by other techniques. The closeness of the sensor to the leak location may enable capturing clean signals so leak detection and localization becomes more independent of pipe material, pipe depth, soil type, background noise, and other environmental effects.

SUMMARY OF THE INVENTION

The leak detection system according to the invention includes a structure sized to fit within a pipe for supporting at least one sensing element near an inside wall of the pipe, whereby a pressure gradient at a leak in the pipe will cause the sensing element to respond to the pressure gradient. Means are provided for detecting movement or deformation of the sensing element, the movement or deformation indicating the presence of a leak. In a preferred embodiment, the structure includes two spaced-apart rings for supporting the at least one sensing element. The sensing element may be a diaphragm. The sensing element may be supported for movement with respect to the ring structure in which the ring structure includes sensing circuitry for detecting the movement.

In a preferred embodiment, the sensing circuitry includes contact points that complete a circuit upon movement beyond a selected threshold. In another embodiment, the ring structure includes a fixed capacitor plate and an elastic capacitor plate that moves with the sensor element to generate a signal indicating a leak. In still another embodiment of the invention an elastic capacitor plate is in operative relation to a fixed capacitor plate. Deformation of the elastic capacitor plate changes the capacitance to indicate a leak.

In yet another preferred embodiment, the sensor element is a diaphragm including at least one piezoelectric element on its surface which deforms to generate a signal in the presence of a pressure gradient resulting from a leak.

In another preferred embodiment, the system includes a body attached to the ring structure. This body includes means for moving smoothly along the pipe. The body may include a plurality of legs for engaging the pipe wall. This body may also include a propeller for moving the structure along a pipe.

Those of ordinary skill in this art will recognize that the above-described embodiments are merely exemplary as there are other ways to detect the pressure gradient near a leak.

BRIEF DESCRIPTION OF THE DRAWING

FIG. 1b is a graph of static pressure against position along the pipe centerline in FIG. 1a.

FIG. 5b is a cross-sectional view of the embodiment shown in FIG. 5a.

DESCRIPTION OF THE PREFERRED EMBODIMENT

The present invention takes advantage of the high pressure gradient in the vicinity of a leak position to develop an in-pipe leak detection device. Studies done by the inventors herein have shown that the large pressure drop inside a pipe as a result of a leak is localized to a region near the leak hole. That is, the drop in pressure is limited to a small region close to the leak and cannot be detected easily at the pipe center line, particularly for small leaks. Based on this recognition, one can place a sensor very close to a pipe wall to detect leaks based on the local pressure gradient.

Figure 1A:
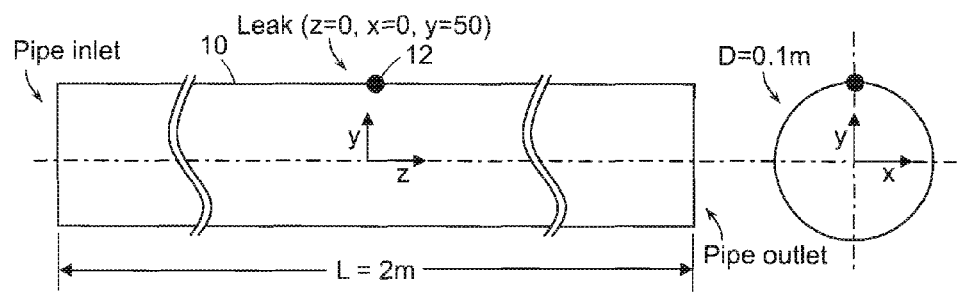
FIG. 1a is a cross-sectional view of a pipe illustrating the location of a leak.
Figure 1B:
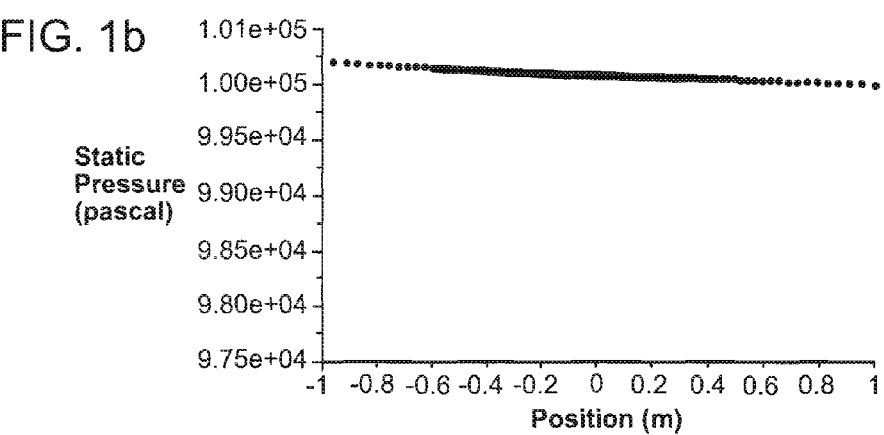
Figure 1C:
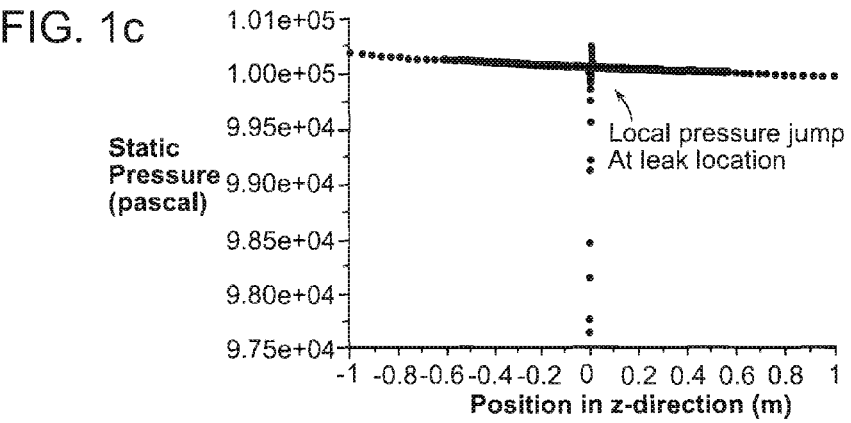
FIG. 1c is a graph of static pressure against position along the pipe at a location near the leak location.

With reference first to FIG. 1a, a simulation of a pipe 10 with a hole resulting in a small leak 12 is shown. FIG. 1b shows the static pressure against position along the pipe for measurements taken at the centerline of the pipe. Note that the presence of the leak 12 is not detectable in the graph of FIG. 1b. However, as shown in FIG. 1c, when the pressure is measured approximately 1 mm from the pipe wall below the leak (y=49 mm) the graph shows a clear pressure jump at the leak location. In particular, the graph in FIG. 1c shows a sudden drop in pressure at the leak followed by a slight increase before it again matches the pressure in the rest of the pipe.

Different ways can be used to detect the high pressure gradient at the leak location. In the present invention, the sensing elements are placed very close to the inner pipe wall circumferentially. The suction force created by the leak due to the high pressure gradient is used to signal the leak existence.

Figure 2:
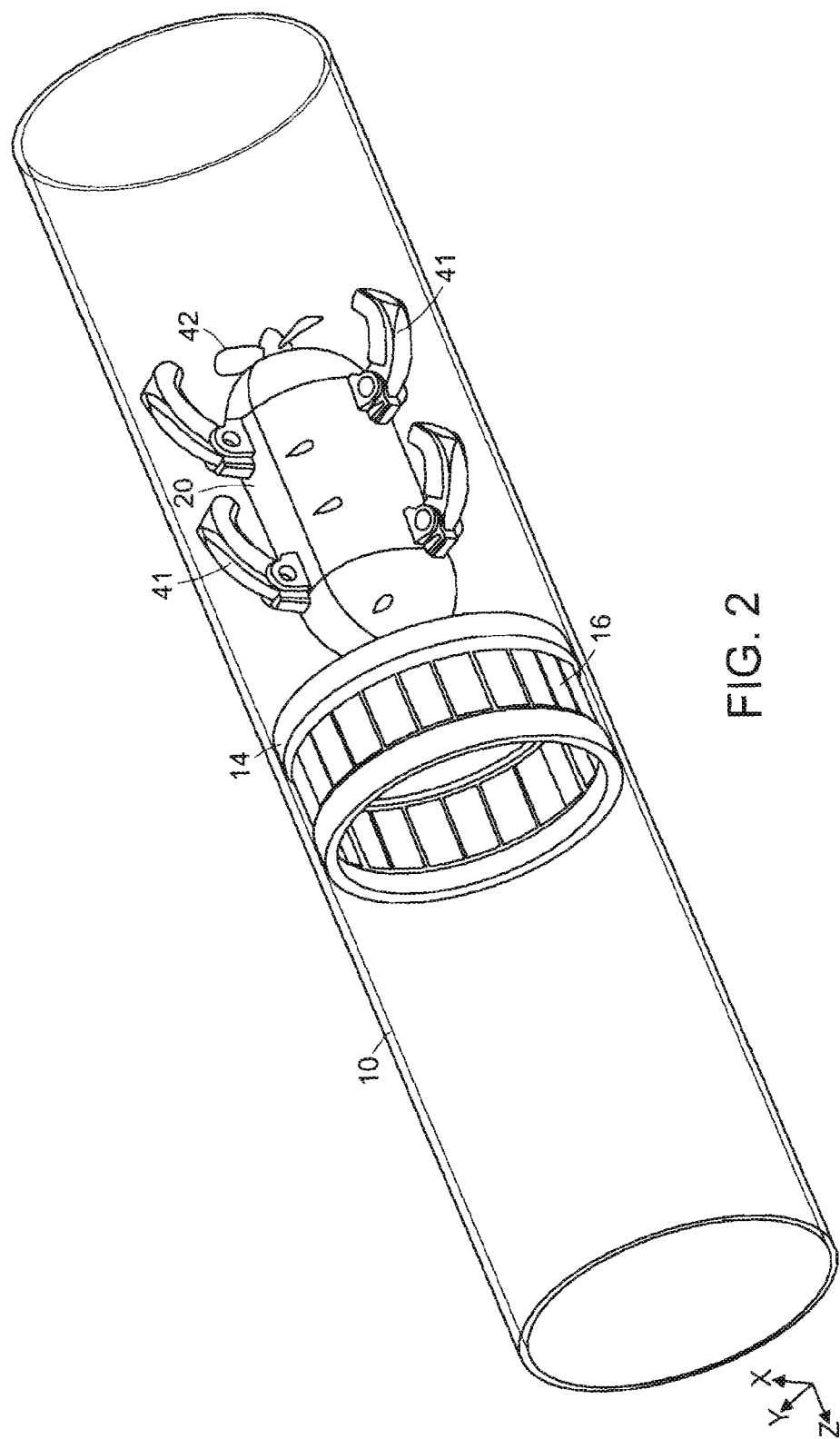
FIG. 2 is a perspective view of an embodiment of the present invention. Note that a pressure gradient sensor may be incorporated in the skin of the floating body 20.

With reference to FIG. 2, a ring-shaped structure 14 hosts sensing elements 16 held very close to a leak with a designed clearance of for example, 1 to 3 mm from a wall of the pipe 10. Rollers 19 (FIG. 3a) may be attached to the sides of the rings to achieve smooth sliding and to maintain a uniform clearance with the wall of the pipe 10. The ring structure 14 may be attached to a body 20 that moves inside the pipe 10. This in-pipe floating body 20 also carries necessary electronic and communication components to identify the existence and location of a found leak. This aspect of the invention will be discussed further below.

Figure 3A:
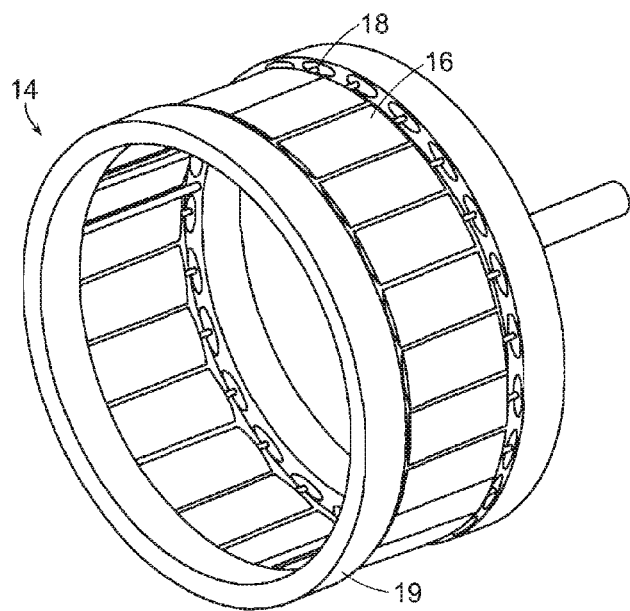
FIG. 3a is a perspective view of the ring structure used in an embodiment of the invention disclosed herein.
Figure 3B:
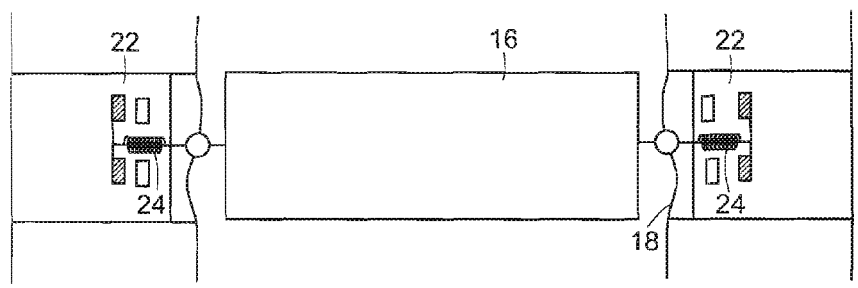
FIG. 3b is a schematic illustration of an embodiment of the invention that uses the movement of a diaphragm to indicate the presence of a leak.

With reference now to FIGS. 3a and 3b, the sensing element 16 is a diaphragm with contact points. As shown in FIG. 3b, the ends of the diaphragm 16 have direct connections to sliding mechanisms 22 in the waterproof ducts in the structure 14 via a flexible connection 18. Springs 24 are provided to allow limited movements. At a leak location, the diaphragm 16 is acted upon by the pressure gradient that causes the sliding mechanism to bring its contact points to close an electrical circuit. When the contacts are closed an alarm is produced to indicate the presence of a leak. FIG. 3a shows a complete ring of sensing diaphragms 16 that cover the whole pipe 10 interior circumferentially. The flexible connection 18 allows the contact mechanism to function while keeping the duct sealed. To avoid false alarms, a minimum suction force (and therefore the required spring stiffness) needed to move the diaphragm is estimated based on pipeline pressure and a minimum detectable leak size/area to be considered. It is possible to use the design in FIGS. 3a and 3b to estimate the size of a leak. By knowing the pressure inside the pipe 10, leak size can be estimated upon measuring the calibrated distance moved by the diaphragm 16 against the springs 24. Those of ordinary skill in the art will recognize that the diaphragm material and properties (such as porosity, thickness, and elasticity) are optimized for high sensitivity and fast response. The dimensions of the system are optimized to permit the structure to maneuver through a pipe. The distance between the two side ducts is optimized to allow enough suction area and time for different leaks that may be encountered.

Figure 4:
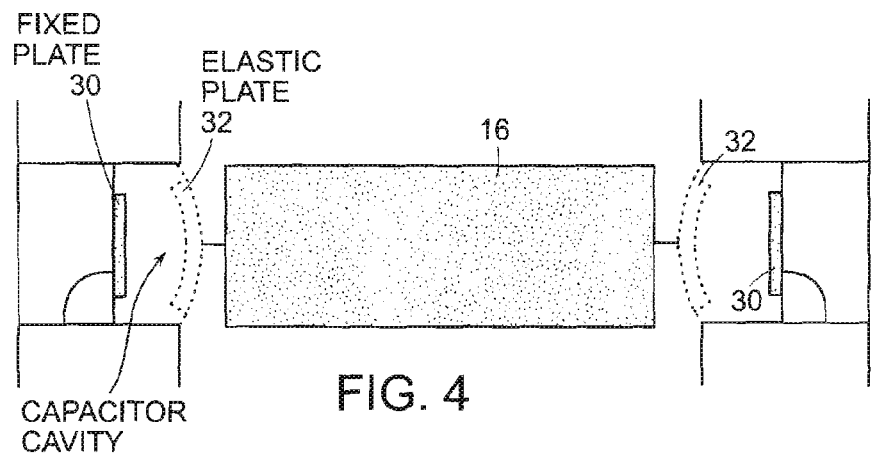
FIG. 4 is a schematic illustration of an embodiment of the invention utilizing elastic capacitor plates at the diaphragm ends. Fixed plates are inside the ring ducts.

Another embodiment of the invention is shown in FIG. 4. With reference now to FIG. 4, a capacitive design is provided. As is well known, a capacitor comprises two conductors separated by a nonconductive (dielectric) medium. In the design of FIG. 4 the diaphragm 16 moves due to pressure suction and varies the output of a built-in capacitor. In particular, a capacitor includes a fixed plate 30 and an elastic plate 32. When the diaphragm 16 is moved as a result of the pressure gradient of a leak, the elastic plate 32 moves relative to its paired fixed plate 30 and produces an electric charge proportional to the suction pressure. Thus, a leak is detected.

Figure 5A:
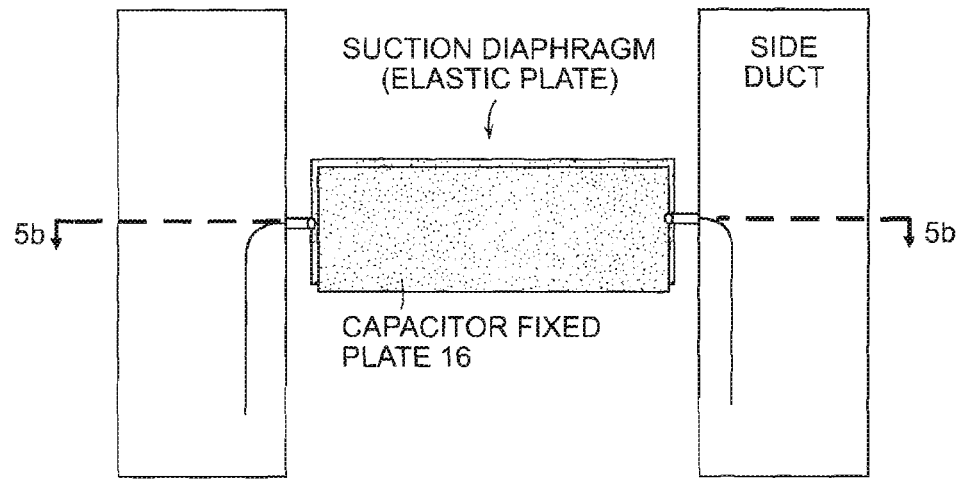
FIG. 5a is a schematic illustration of an embodiment of the invention using a fixed and an elastic capacitor plate. The diaphragm itself is the capacitor.
Figure 5B:
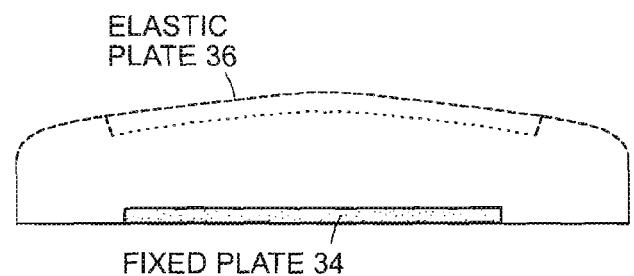

With reference now to FIGS. 5a and 5b, the sensing elements 16 hosted by the ring structure are comprised of capacitor sensing elements. As shown in FIG. 5b the sensor includes a fixed plate 34 and an elastic plate 36. The elastic plate 36 will face the pipe 10 wall. At a leak, the elastic plate 36 moves toward the leak because of a pressure gradient. This movement changes the distance between the fixed plate 34 and the elastic plate 36 of the capacitor to produce a noticeable charge output.

Figure 6A:
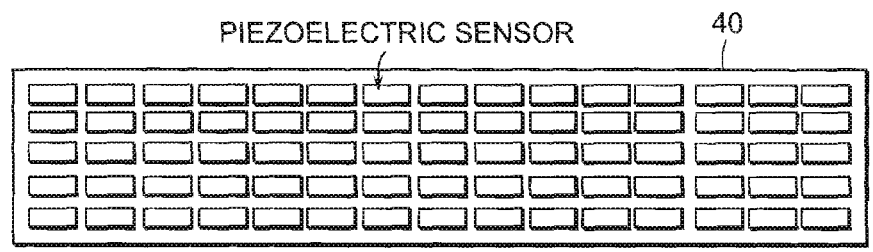
FIG. 6a is an illustration of the distribution of piezoelectric sensors used in an embodiment invention.
Figure 6B:
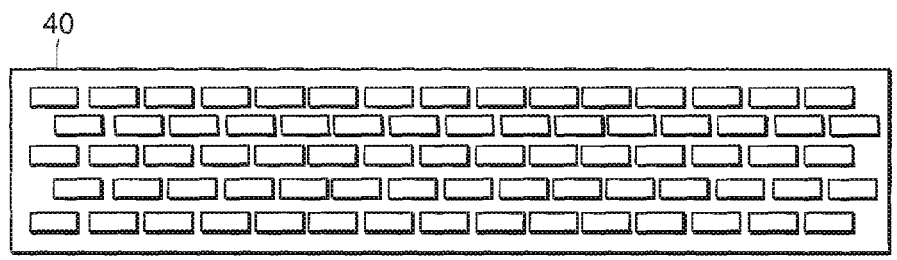
FIG. 6b is a schematic illustration of another distribution for an embodiment of a piezoelectric sensor for use in the invention.
Figure 6C:
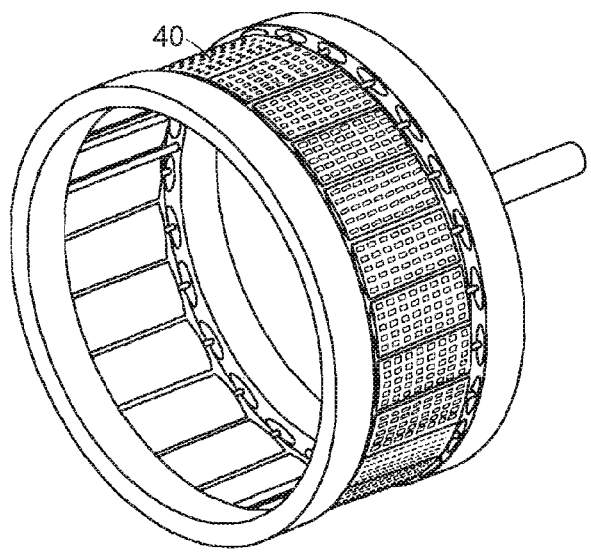
FIG. 6c is a schematic illustration of an embodiment of the invention using piezoelectric sensors.

Other designs are shown in FIGS. 6a, b, and c. In this embodiment, the sensing element is a single continuous piezoelectric diaphragm 40. The piezoelectric sensing elements are distributed on the circular diaphragm 40 surface. When the diaphragm passes a leak, some of the piezoelectric elements are sucked upon and produce a proportional charge output. This charge is later converted to a voltage or a current output for leak detection. Those of ordinary skill in the art will recognize that piezoresistive elements may be used instead of piezoelectric elements. It is also apparent that the voltage output from the activated elements can be used to estimate the leak flow rate for a known pipeline pressure. Moreover, the leak size and shape can be determined by knowing the locations and the sequence of the piezo sensors activated by a detected leak. As shown in FIGS. 6a and b, the piezo sensors may be of different styles (either lined up or staggered) for better coverage.

Returning to FIG. 2, the floating body 20 has six legs 41 (only four legs can be seen in FIG. 2) that slide or roll smoothly on the inner pipe wall. As mentioned earlier, the body 20 carries the necessary electronics and equipment for data storage/processing and communication. The body 20 has a streamlined shape to minimize induced turbulence and pressure fluctuations. The body 20 is adapted to float inside the pipe with the normal pipe flow. If desired, the body 20 may include a propeller 42 for controlling the speed of the floating body 20. It is also contemplated that the floating body 20 incorporates the sensing element directly in its own outer skin.

The leak detection system disclosed herein may be easily introduced into a pipe network and then retrieved therefrom, by the use of a double-gated port valve (not shown) that can be easily integrated into a pipe network or tire hydrants. This detection system can also be used for pressurized pipes with no water flow for leak detection. In this case the body 20 uses the propeller 42 that is activated remotely and thus the body 20 acts like a submarine inside the pipe with full control of its speed and location.

Once deployed, the system of the invention records the real time onboard. When a leak is detected, the device wirelessly sends a real time signal through the water core to a pre-located receiver with a suitable communication protocol. The difference in time between sending and receiving the signal is used to locate the leak based on signal speed in the water filled pipe 10. Another way to localize the leak is to store the required information in an onboard memory for post-processing.

A parametric study has been carried out using the three-dimensional steady CFD model to investigate the effect of leak size and shape on the flow field around a leak. The study covers different flow conditions, namely, pressure from one to six gauge-bars and velocities up to 2 m/s. Clear changes of flow field were found at the leak location. However, these changes were limited to a small region close to the leak point (about 2 mm) as shown in FIG. 1. The pressure change is very significant and a high gradient is exhibited very close to the leak location. The high gradient pressure increases as pressure within the pipe 10 increases.

The inventors have carried out initial experiments to verify the ability of using pressure and velocity changes in the vicinity of the leak to detect the leak. The experiments conducted by the inventors used thin flaps or "leaves" that were forced outwardly by the rapid pressure drop formed in the proximity of a leak. A high precision submersible pressure sensor was used to measure the pressure gradient. Then, rubber strips were used to emulate the use of "leaves" to perceive the leak. The rubber strips had to be very close to the leak in order to be affected. Once the strip was pulled up against the leak, the friction created between the wall and the strip was found to be strong enough that it could be utilized.

It is recognized that modifications and variations of the present invention will be apparent to those of ordinary skill in the art and it is intended that all such modifications and variations be included within the scope of the appended claims.

REFERENCES

1. Hunaidi, O., Chu, W., Wang, A., and Guan, W., 1999, leak detection method for plastic water distribution pipes, Advancing the Science of Water, Fort Lauderdale Technology Transfer Conference, AWWA Research Foundation, Ft. Lauderdale, Fla., February 18, 249-270.
2. Geiger, G., 2006, State-of-the-art in leak detection and localization, Oil Gas European Magazine, 32(4), 193-198.
3. Hunaidi, O. and Chu, W. T., 1999, Acoustical Characteristics of Leak Signals in Plastic Distribution Pipes, Applied Acoustics, 58(3):235-254.
4. Yang, J., Wen, Y. and Li, P., 2008, Leak location using blind system identification in water distribution pipelines, Journal of sound and vibration, 310:134-148.
5. Kurtz, D. W., 2006, Developments in a Free-Swimming Acoustic Leak Detection System for Water Transmission Pipelines, ASCE, Proceedings of the 2006 Pipeline Division Specialty Conference Pipelines 2006: Service to the Owner, 211(40854):25, Chicago, Ill., USA, July 30-August 2.
6. Kurtz, D. W., 2007, Case Studies for a Free-Swimming Acoustic Leak Detection System used in Large Diameter Transmission Pipelines, Proceedings of the ASCE International Conference on Pipeline Engineering and Construction, p 105, Pipelines 2007: Advances and Experiences with Trenchless, Boston, Mass., USA, July 8-11.
7. Galleher, J. J., and Kurtz, D. W., 2008, Evaluation of an Un-Tethered Free-Swimming Acoustic Leak Detection Technology, Proceedings of Pipelines Congress 2008—Pipeline Asset Management: Maximizing Performance of Our Pipeline Infrastructure, 321, Atlanta, Ga., July 22-28.

What is claimed is:

1. Leak detection system comprising:
    structure sized to fit within a pipe conveying water for smooth sliding within the pipe while maintaining a uniform clearance in the range of 1 to 3 mm with an inside wall of the pipe for supporting at least one sensing element near the inside wall of the pipe, whereby a pressure gradient in the water at a leak in the pipe will cause the sensing element to respond to the pressure gradient in the water to indicate a leak while the structure is moving within the pipe.
2. The system of claim 1 wherein the structure includes two spaced-apart rings for supporting the at least one sensing element.
3. The system of claim 1 wherein the sensing element is a diaphragm.
4. The system of claim 1 wherein the sensing element is supported for movement with respect to the structure, the structure including sensing circuitry for detecting the movement.
5. The system of claim 4 wherein the sensing circuitry includes contact points that complete a circuit upon movement beyond a selected threshold.
6. The system of claim 4 wherein the structure includes an elastic capacitor plate that moves with the sensor element to generate a signal indicating a leak.
7. The system of claim 1 wherein the sensor element comprises:
    an elastic capacitor plate in operative relation to a fixed capacitor plate, wherein deformation of the elastic capacitor plate changes the capacitance to indicate a leak.
8. The system of claim 1 wherein the sensor element is a diaphragm including at least one piezoelectric element on its surface which deforms to generate a signal in the presence of a pressure gradient resulting from a leak.

* * * * *